Figure 1:
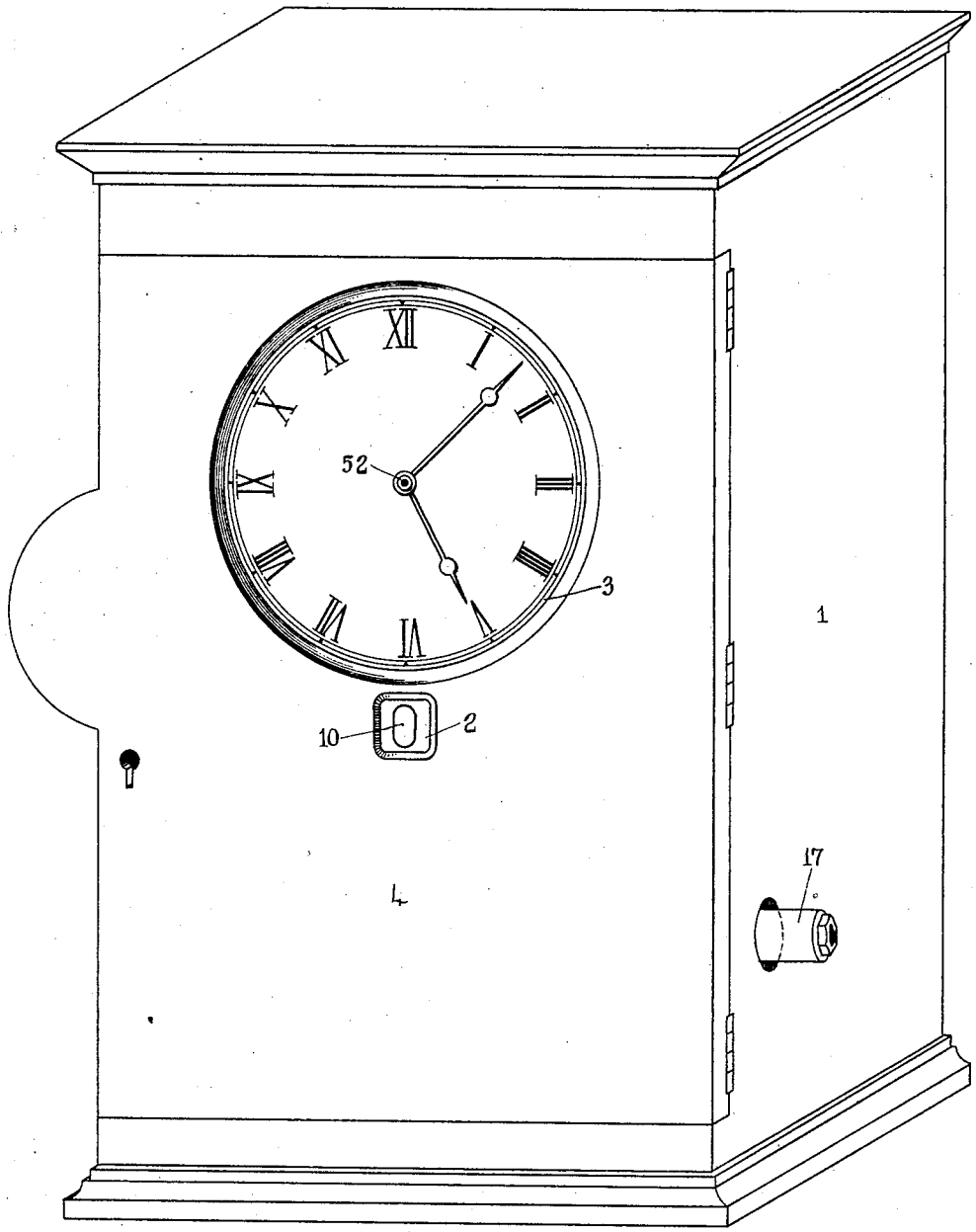

A. TURNER.
SPEED INDICATOR.
APPLICATION FILED MAY 14, 1907.

905,769.

Patented Dec. 1, 1908.
4 SHEETS—SHEET 2.

Witnesses:—
W. P. Burke
M. Petit

Inventor.
Archibald Turner
ATTY

A. TURNER.
SPEED INDICATOR.
APPLICATION FILED MAY 14, 1907.

905,769.

Patented Dec. 1, 1908.
4 SHEETS—SHEET 4.

Witnesses:—

Inventor.
Archibald Turner
ATTY.

UNITED STATES PATENT OFFICE.

ARCHIBALD TURNER, OF LEICESTER, ENGLAND.

SPEED-INDICATOR.

No. 905,769. Specification of Letters Patent. Patented Dec. 1, 1908.

Original application filed November 20, 1905, Serial No. 228,279. Divided and this application filed May 14, 1907. Serial No. 373,620.

*To all whom it may concern:*

Be it known that I, ARCHIBALD TURNER, subject of the King of Great Britain, citizen of Leicester, England, residing at Grange Lane, Leicester, England, have invented new and useful Improvements in Speed-Indicators, of which the following is a specification.

This invention has for its main object to produce a speed indicator specially adapted for use in connection with motor cars and other traveling vehicles.

The indicator comprehended by the present invention is arranged to exhibit for a pre-determined short interval the maximum speed at which the vehicle traveled during an immediately preceding period of the same or approximately the same duration.

The invention also provides that the time at which the speed is being traveled, shall be indicated.

The invention comprises a suitable casing within which the mechanism is inclosed, and the said casing has an inspection opening therein past which the indicator or dial moves and opposite which opening the indicator rests for a certain period to show the speed the vehicle traveled during the immediately preceding similar period.

The indicator dial has marked at regular intervals and in numerical progression around its face, near its circumference the numbers, any one of which when opposite the aforesaid inspection opening indicates the rate at which the vehicle is traveling. The said indicator dial is mounted loosely upon a fixed arbor and is connected with a ratchet wheel (also mounted upon the same arbor) so that the latter can move the dial forward, when the said ratchet wheel is driven by a plunger operated directly or indirectly in any suitable manner from the axle, wheel or other moving part of the vehicle.

The indicator dial and its driver ratchet wheel are each arranged to be returned by spring influence to their starting point, as hereinafter described, at certain predetermined intervals, but at alternate times, the object of which is that the dial shall remain stationary for a certain period, say 18½ seconds, more or less, during which time the numeral thereon opposite the inspection opening exhibits the maximum rate of speed the vehicle attained during an immediately preceding interval of the same or approximately the same duration. In order to permit these return movements, the detents which prevent back motion of the driving ratchet and the dial respectively are alternately released or lifted periodically whereupon the said ratchet wheel, being first free, moves backwards on its arbor under spring influence until a stop or pin thereon arrives in contact with a fixed pin or equivalent on the framing. Likewise the dial, when subsequently freed of its detent, returns and comes to rest as soon as a pin thereon meets the pin on the ratchet wheel whether the latter is at zero or starting point or has been advanced again by the plunger. The release alternately of the said detents for the purpose described is as follows:—The detents are carried upon short arbors attached to the framework of the mechanism and may be provided with suitable springs to normally hold them in engagement with the ratchet wheel and dial respectively. Carried on the opposite side of the mechanism is a two armed lever, one arm of which is engaged by a star wheel attached to a spindle carried in the main framework of the mechanism. The other arm is connected with a lever by suitable mechanism and arranged to be operated by a toothed wheel driven by the ordinary mechanism of a clock. As according to the arrangement hereinbefore mentioned the detents, controlling the dial and its driving ratchet respectively, are to be released at certain predetermined regular intervals, the said toothed wheel is driven by the minute arbor of the clock, the teeth of said wheel lifting the two armed lever and allowing the star wheel (which is driven from a separate barrel and spring) to partially rotate so that projecting pins on a drum on the opposite end of the same spindle may engage and lift the detents at the times required.

This invention will however be more clearly understood from the following further description with reference to the accompanying sheets of drawings, in which:—

Figure 2:
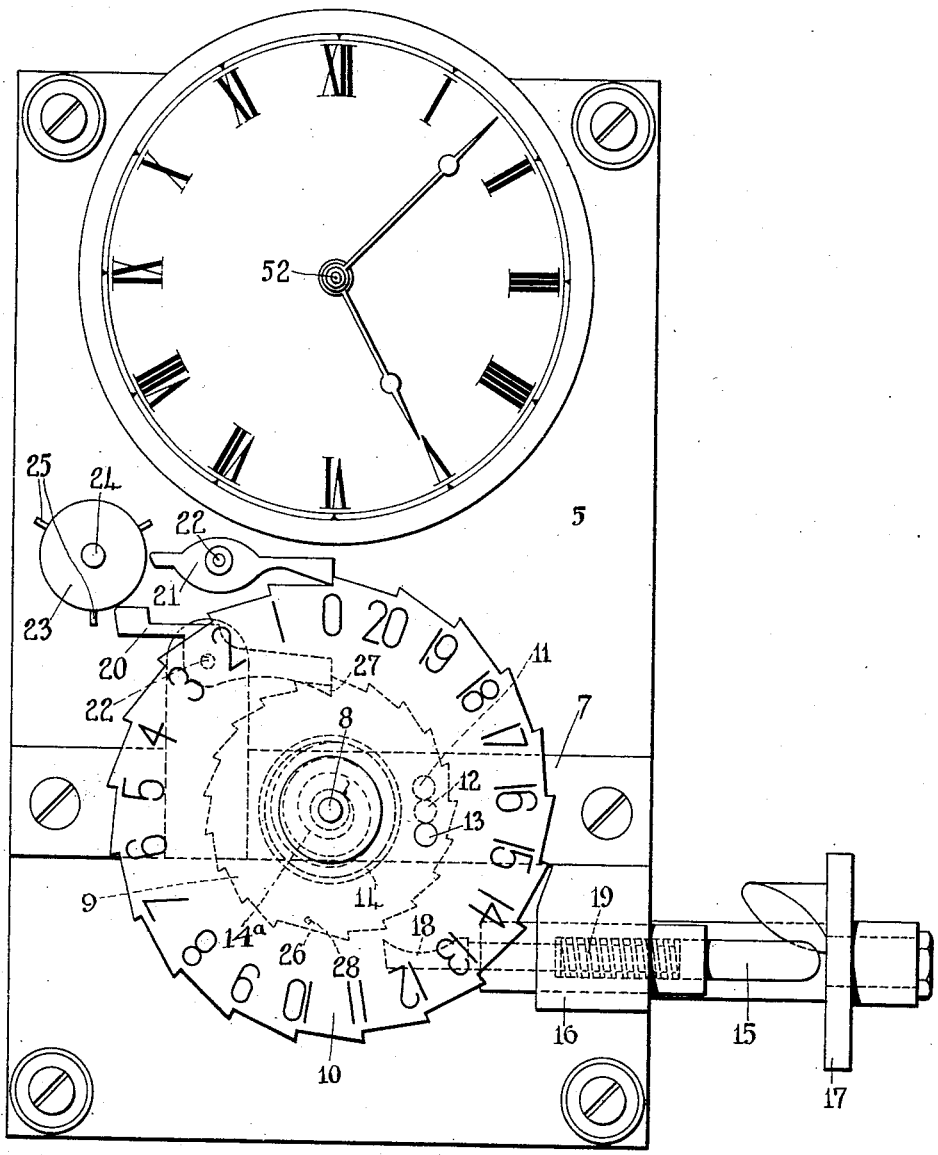
Figure 3:
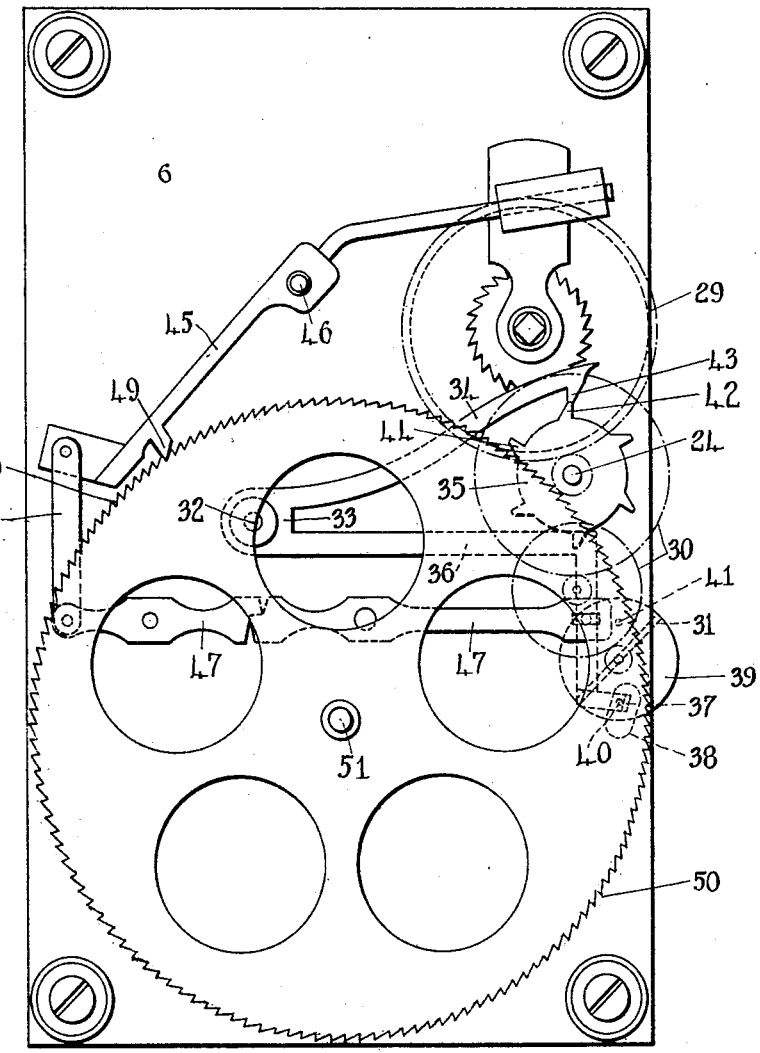
Figure 4:
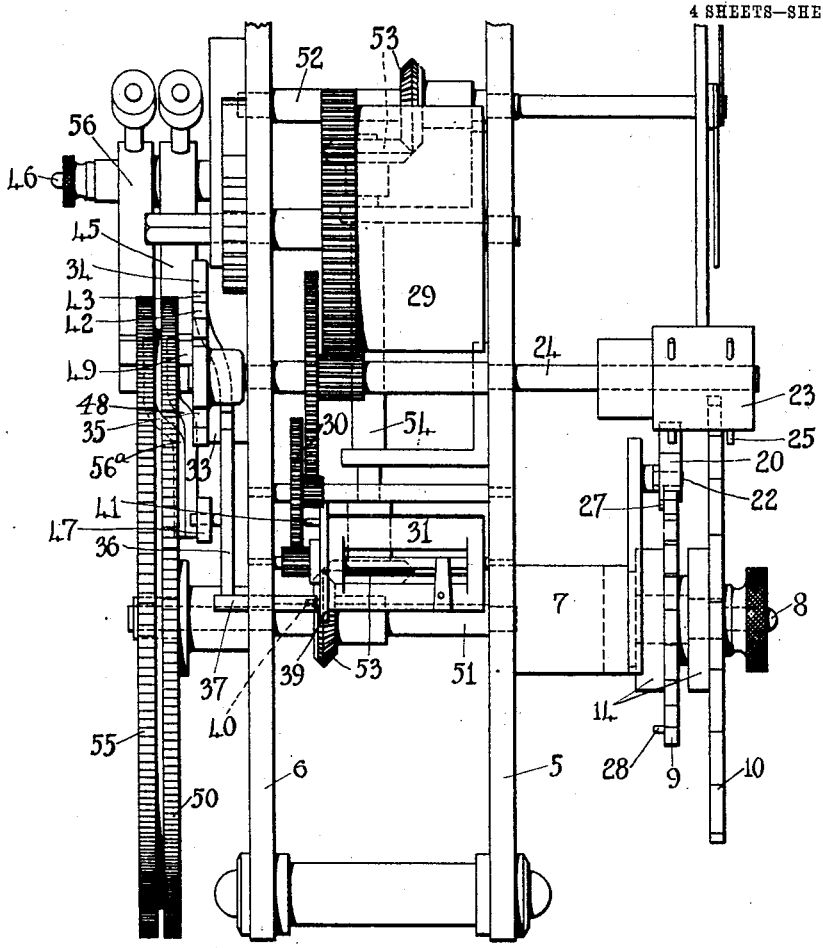
Figure 5:
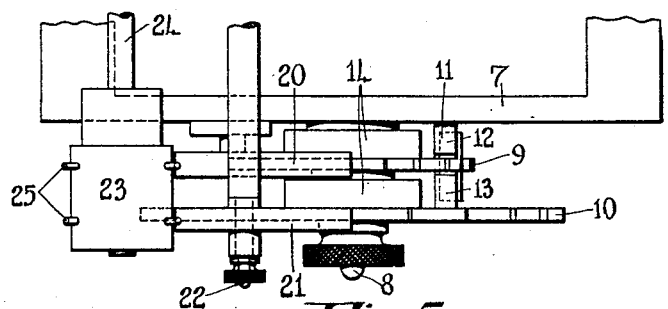

Figure 1., is a perspective view of the outside of the case. Fig. 2., is a front elevation of the mechanism, removed from the case. Fig. 3., is an elevation of the back of the mechanism, showing the means for releasing the detents of the indicator dial and its driving ratchet respectively. Fig. 4., is a side elevation of the mechanism looking from the left of Fig. 2, and from the right of Fig. 3. Fig. 5., is a plan of the indicator dial and its connected parts.

Fig. 1 is drawn to a smaller scale than the remaining figures and the same reference characters are employed to designate like parts throughout the drawings.

The invention as shown in Fig. 1, comprises mainly a casing 1, wherein the mechanism is contained, the front of the casing being provided with an inspection opening 2 past which the indicator or dial moves, and also a larger opening 3 behind which the clock face may be seen. A door 4 or similar means may be provided for gaining access to the mechanism when desirable.

The mechanism, when removed from the casing 1, comprises mainly frame plates 5 and 6 (Figs. 2 to 4) between which the clock and other gear, driving barrels, and wheel trains are carried, and on the outer faces of which plates the mechanism for indicating and releasing the detents respectively, is attached. Referring to Figs. 2, 4 and 5 the plate 5 of the frame has attached thereto a bridge or bar 7 provided in the center with a fixed arbor 8 having loosely mounted thereon a ratchet wheel 9 and indicator dial 10. The bridge 7 is also provided with a projecting stop 11 (Fig. 2) against which a pin 12 on the ratchet wheel 9 makes contact, and a pin 13 on the dial 10 is adapted to engage the said pin 12 so that the backward movements of both dial and ratchet wheel are checked by the stop 11. When in the position as shown in Fig. 2 the dial and ratchet wheel are both at zero, or starting point, and suitable springs 14ª (Fig. 2) contained within the barrels 14 are attached to the arbor 8 and always return the said dial and ratchet wheel to zero (when free of their detents) after having been advanced as hereinafter described. The indicator dial 10 has marked at regular intervals and in numerical progression around its face as shown in Fig. 2 the numbers any one of which when opposite the aforesaid inspection opening 2 exhibits the rate of speed. The ratchet wheel 9 is driven forward by means of a plunger 15 carried in a block 16 on the plate 5, and operated by means of a cam 17 rotated through the medium of intermediate mechanism as hereinafter described from the wheel or axle of the vehicle. As the said cam rotates, the plunger 15 is pushed forward and a pawl 18 on the end thereof engages one of the teeth of the ratchet wheel 9 and advances the said wheel one tooth round, the length of movement of the plunger being arranged to effect this result. The plunger is returned under the influence of a spring 19 and it will be understood that for each forward stroke of the said plunger the ratchet wheel will be advanced one tooth. By reason of the engagement of the pin 12 with the pin 13 on the dial, the latter will also be intermittently advanced with the forward movement of the ratchet wheel, and in order to prevent the latter and the dial 10 returning to zero until required, detents 20 and 21 are provided to engage the said ratchet wheel and dial respectively as shown in Figs. 2 and 5, the dial being furnished at the periphery with teeth to correspond with the ratchet wheel, and the said detents being carried on arbors 22 fixed in the framework.

It will be understood that, when the vehicle is traveling, the ratchet wheel 9 is being constantly advanced a tooth at a time by the plunger 15, and in order to indicate the varying maximum speed (that is, miles per hour) at which the vehicle is traveling, it is necessary that the said ratchet wheel and the dial should be returned to zero or starting point at certain regular intervals, say every 20 seconds, which period is found in practice to be most convenient. This return movement is obtained by lifting the detents, 20 and 21 at the end of every 20 seconds when the ratchet wheel and dial being free will be returned under the influence of the springs before mentioned. It is also necessary that the ratchet wheel and dial should be returned at alternate times in order that the dial may remain stationary behind the inspection opening 2 for a certain period approximately 18½ seconds. This alternate lifting of the detents 20 and 21 for the purpose mentioned is carried out by means of a drum 23 attached to a spindle 24, the said drum having projecting pins 25 which, as the spindle 24 revolves, alternately engage the ends of the detents and lift same. The alternate releasing of the ratchet wheel and dial as just described gives the following result. The dial 10 is intermittently advanced by the ratchet wheel 9 until the latter is released and returns to zero, the dial meanwhile being held stationary in its advanced or forward position, by the detent 21. During the time the dial is thus at rest, the ratchet wheel 9 is being again moved forward by the plunger 15 and when the said dial is released it immediately returns until its pin 13 comes into contact with the pin 12 on the ratchet wheel, whereupon the dial 10 will be again advanced until the ratchet wheel is released when the dial will remain stationary and exhibit through the opening 2 the maximum speed at which the vehicle traveled during the immediately preceding 20 seconds.

It will be noticed, in Fig. 2, that the numbers on the indicating dial 10 do not advance higher than 20 and in order that the said ratchet wheel and dial may be free from engagement with the plunger 15 and therefore not actuated by the latter should the speed of the vehicle exceed the limit of 20 miles per hour, the last tooth on the ratchet wheel 9 is omitted, as shown at 26, so that when the ratchet wheel has made a complete revolution the moving plunger will run free and not actuate the ratchet and dial. To prevent back motion of the ratchet wheel 9, when the space 26 comes round to the detent 20, a lip 27 on the side of the latter engages a pin 28 on the back of the ratchet wheel, see Figs. 2 and 4. In order that a quick lifting and falling movement may be imparted to the detents 20 and 21 the drum 23 and spindle 24 are intermittently rotated, each movement being equal to 1/6th of a revolution and 6 movements taking place per minute thus giving an alternate lift to each detent at successive regular intervals of 20 seconds. This intermittent rotary movement is imparted to the drum 23 by the following mechanism shown in Figs. 3 and 4. The spindle 24 is driven directly from a separate driving barrel 29 and main spring (not shown) the latter being adapted to be wound up in the usual way, and connected to the spindle by means of a train of wheels 30, is a "fly" or fan 31 for steadying the speed of the said spindle 24 when the latter rotates. Carried on a short arbor 32 on the plate 6 is a two armed lever 33 the upper arm 34 of which is shaped to engage a star wheel 35 attached to the end of the spindle 24. The lower arm 36 of the same lever 33 is provided with a projecting finger 37 passing through an opening 38 in the plate 6 of the frame. Attached to the "fly" spindle is a disk 39 furnished on its outer face with projecting pins 40 and 41 adapted to engage the finger 37, and when in the normal position as shown in Fig. 3 the "fly" 31 is prevented from rotation by reason of the pin 40 coming into contact with the finger 37. When the lever 33 is lifted, the finger 37 will rise clear of the pin 40 and allow the "fly" to rotate half a revolution whereupon the pin 41 will come into contact with the raised finger 37 and again stop the movement, the half revolution of the "fly" 31 however is sufficient to allow the tooth 42 of the star wheel 35 to move clear of the end 43 of the arm 34 so that when the lever 33 is dropped again, the finger 37 will fall lower and clear of the pins 40 and 41 and the mechanism will be free to rotate until the next tooth 44 on the rotating star wheel causes the end 43 to ride up it and thus lift the finger 37 into the path of the pin 40 when the movement will stop until the lever 33 is again lifted. The star wheel 35 is furnished with 6 teeth so that 6 intermittent movements of the spindle 24 per revolution may result.

In order to impart the necessary rise and fall to the lever 33 at regular intervals, for the purpose just described, a lever 45 carried on an arbor 46 on the plate 6 is connected to the lower arm 36 of the lever 33 by a series of compound levers 47 and link 48. A tooth 49 on the under face of the said lever 45 engages a ratchet wheel 50 attached to an arbor 51 driven from the main minute arbor of the clock by miter wheels 53 and a vertical spindle 54 (see Fig. 4). As the teeth of the ratchet wheel 50 move forward, the lever 45 will be first gradually lifted allowing the half revolution of the "fly" 31, and when the tooth 49 drops off the teeth of the ratchet wheel the spindle 24 will be partly rotated as previously described. The arbor 51 is driven at the same speed as the main minute arbor of the clock, and the ratchet wheel 50 having 180 teeth imparts a movement to the lever 33, 3 times per minute. In order to give the alternate lifts to the said lever 33 (6 lifts per minute being necessary) a second ratchet wheel 55 and lever 56 are provided (Fig. 4) the ratchet wheel being fixed on the same arbor 51 as the ratchet wheel 50 and the lever 56 also being carried on the arbor 46. A second link 56$^a$ connects the lever 56 with the compound levers 47, the ratchet wheel 55 being set and fixed so that the teeth of the latter are located midway between the teeth of the ratchet wheel 50. By this arrangement an alternate lift of the lever 33 is obtained, thus releasing the shaft 24, six times during the minute. The wheel 55 and lever 56 are removed from Fig. 3, for the sake of clearness.

According to the arrangement of mechanism as herein described the indicator dial 10 is moved round, to indicate the varying speed, three times per minute, and has a period of rest each time of approximately 18½ seconds, (the other 1½ seconds being absorbed in each advance movement of said dial) and it will be obvious that such period may be varied and the dial arranged to indicate with greater or less frequency by providing the operating ratchet wheels 50 and 55 with a greater or less number of teeth, but at the same time it will be understood that the driven cam 17 is always geared down to the proper ratio with the number of indications per minute of the dial. The cam 17 may be connected with, and driven from the wheel or axle of the vehicle in any convenient manner such for example as a flexible shaft connected direct to the said cam and at the opposite end to any suitable gearing, which any mechanic can readily devise, connected to the wheel or any moving part of the vehicle. Any ordinary cyclometer may (if desirable) be attached to the machine for showing the total mileage traveled.

What I claim then is:—

A speed indicator comprising a dial having a stop thereon, a ratchet wheel having a stop thereon engaging with the stop on the dial, means operated by the movement of the vehicle for giving said ratchet wheel a step by step movement, a spring for returning the dial and ratchet wheel back to normal position, detents engaging with the dial and ratchet wheel for preventing backward movement thereof, a drum having projections thereon engaging with the detents for disengaging the same from the ratchet wheel, means for rotating the drum, a governor for controlling the rotation of said drum, a clockwork, and means controlled by the said clockwork and engaging with the governor for giving an intermittent movement to the drum.

In testimony whereof I have signed my name to this specification in the presence of two subscribing witnesses.

ARCHIBALD TURNER.

Witnesses:
E. N. LEWIS,
WALTER W. BALL.